United States Patent [19]

Jachimowicz et al.

[11] 4,312,965
[45] Jan. 26, 1982

[54] PROCESS FOR FORMING AMINE/AMIDE CONTAINING POLYMERS

[75] Inventors: Felek Jachimowicz; Joseph W. Raksis, both of Columbia, Md.

[73] Assignee: W. R. Grace & Co., Columbia, Md.

[21] Appl. No.: 123,740

[22] Filed: Feb. 22, 1980

[51] Int. Cl.$^3$ .............................. C08F 8/32; C08F 8/10
[52] U.S. Cl. ................................... 525/378; 525/333; 525/334; 525/374; 525/379; 525/383; 528/392; 528/396; 528/422; 528/425
[58] Field of Search .............. 528/392, 396, 422, 425; 525/333, 334, 374, 378, 379, 383

[56] References Cited

U.S. PATENT DOCUMENTS 2,422,631 6/1947 Olin et al. ..................... 260/563 R
3,513,200 5/1970 Biale ............................. 260/583 R
4,096,150 6/1978 Berthoux et al. ................ 260/576

FOREIGN PATENT DOCUMENTS 1072796 6/1967 United Kingdom .
1178308 1/1970 United Kingdom .
1378185 12/1974 United Kingdom .
1468773 3/1977 United Kingdom .

OTHER PUBLICATIONS

UK Patent Application, GB, 2044757, 4/1980.

*Primary Examiner*—Harold D. Anderson
*Attorney, Agent, or Firm*—P. M. Pippenger

[57] ABSTRACT

A process for forming polymeric polyamine/amide by contacting, in a liquid media, a hydrocarbon polymer having olefinic double bonds therein, a nitrogen containing compound selected from ammonia, or a monomeric primary or secondary amine, water, and carbon monoxide, in the presence of a catalytic amount of a rhodium atom containing compound selected from metallic rhodium, rhodium salts, rhodium oxides, rhodium carbonyls and ligands thereof at a temperature of from 50° to 250° C. and at a pressure of from about 30 to about 300 atmospheres.

12 Claims, No Drawings

PROCESS FOR FORMING AMINE/AMIDE CONTAINING POLYMERS

BACKGROUND OF INVENTION

The present invention is directed to a process of forming polymeric polyamines having the form of a hydrocarbon polymer backbone with amine alone or with amide groups pendent therefrom. Such polymeric materials are presently formed by complex synthesis such as taught by Boileau et al in *Polymer*, 19, 423 and by Gibson et al, *Macromolecules*, 9, 688. The single step catalytic process of the present invention permits the formation of such desired polymeric polyamine/amide in an economical manner.

Catalytic aminomethylation of monoolefins by secondary amines, carbon monoxide and hydrogen was initially taught by Dr. Walter Reppe in *Experiention*, Vol. 5, p. 93 (1949) German Pat. No. 839,800 and *Liebigs Ann. Chem.*, Vol. 582, p. 148 (1953). The value of the process was, however, limited by the required use of large quantities of toxic iron or nickel carbonyls as catalyst, the rapid rate of consumption of the catalyst, the slow rate of reaction, and the poor yields obtained. Moreover, the reaction was taught to be restricted to monoolefins and low molecular wight monoamines.

Other monoolefins have been reacted in the presence of other metal carbonyls to cause aminomethylation, but the reactions have been found to be non-selective and produced, at best, only moderate yields of desired product. For example, U.S. Pat. Nos. 2,422,631 and 3,234,283 disclose that lower olefins, carbon monoxide, hydrogen, and a secondary amine will form, in low yields, tertiary amines in the presence of cobalt hydrocarbonyl or dicobalt octacarbonyl as well as certain other cobalt compounds when reacted under high temperatures and pressure.

More recently, U.S. Pat. Nos. 3,513,200 and 4,096,150 have disclosed the utilization of Group VIII metal compounds to catalyze the aminomethylation reaction of monomeric olefins with secondary amines to form monomeric tertiary amines. The reactions are generally plagued by the formation of significant amounts of by-products and are specifically directed to the formation of tertiary amines.

Each of the known processes are directed to the formation of monomeric amines from low molecular weight monoolefins and, most preferably, from the olefins of ethylene, propylene and the like or from olefins having terminal double bonds as the reactive cite.

Polymeric compounds which contain amino and amido groups therein are known to be useful as surfactants, flocculating agents, softeners, and as components of coating compositions. Formation of these desired polymers by conventional means has been difficult and costly. It is, therefore, highly desired to find an economical process for forming such polymeric materials.

SUMMARY OF THE INVENTION

The present process is directed to a one-step, catalytic method of forming amine/amide containing polymers in high yields by contacting the reactants of multi-olefin bond containing polymer, carbon monoxide, water, and a nitrogen compound selected from ammonia, or a monomeric primary or secondary amine is the presence of a catalytic amount of a rhodium compound selected from metallic rhodium, rhodium salts, oxides, carbonyls, phosphines or ligands. The reaction is carried out in an inert solvent at temperatures of from 50° to 250° C. and at a pressure of from about 30 to about 300 atmospheres.

DETAILED DESCRIPTION

The subject invention is directed to a new and novel one-step, catalytic method of forming polymeric polyamine/amide by contacting, in an inert solvent, a polymer having a multiplicity of olefinic unsaturation therein, with water, carbon monoxide and a nitrogen containing compound in the presence of certain rhodium compounds as more completely described herein below.

Polymeric compounds having olefinic unsaturation therein are well known and the methods of forming the same are well known. The term "olefinic containing polymer" or "olefinic prepolymer", as used herein, is meant to define homopolymers and copolymers which contain a multiplicity of olefinic bonds distributed throughout the polymer chain either as a part of the polymer backbone or as a part of the pendent group. The average molecular weight of the olefinic containing polymer should be at least about 500. The subject process can be utilized on high molecular weight olefinic containing polymers having average molecular weights of from about 5,000 to 100,000 and above.

The olefinic containing polymers useful herein can be formed from monomers having multiple olefinic groups therein alone (homopolymers), or in combination with other monomers, by conventional cationic, anionic, free radical, coordination or supported metal catalysts processes, as are well known by the artisan.

The olefinic containing polymers useful herein can be homopolymers formed from $C_4$ to $C_{10}$ monomers having multiple olefinic groups therein, such as, for example, from butadiene; cyclopentadiene; dimers of cyclopentadiene; 1,3-pentadiene; 1,4-pentadiene; 1,3-hexadiene; 1,4-hexadiene; 1,5-hexadiene; 2,4-hexadiene; 1,3,5-hexatriene and the like, as well as such monomers containing substituents thereon which are inert with respect to aminomethylation, such as $C_1$–$C_3$ alkyl, halo and carbonyl radicals. The olefinic containing polymer used in the subject invention may be in any of their isomeric stereoconfigurations. In the case of polybutadiene, for example, it can be in its cis-1,4-; trans-1,4-; or trans-1,2 configuration or a mixture thereof. Further, the polymers useful herein may be copolymer formed from two or more monomer compounds which are each capable of forming a polymeric segment containing olefin bonds therein, such as copolymers having polybutadiene segments as, for example, copolymers of poly(butadiene-isoprene, poly(butadiene-1,4-pentadiene) and the like.

The olefinic containing polymers useful herein can also be copolymers formed from at least one monomer as described above capable of producing olefin containing polymer segments and at least one copolymerizable vinyl monomer which does not form olefin containing polymer segments, such as acrylamides, acrylonitrile, styrene, actylates, alkyl vinyl ethers, alkyl vinyl ketone and the like, and mixtures thereof, and $C_1$-$C_{20}$ hydrocarbyl derivates of such monomers, such as x-methyl styrene, methyl methacrylate and the like. Such materials are formed in conventional manners by free radical, cationic or anionic polymerization techniques, as are well known. A large variety of these polymers can be readily obtained commercially, such as poly(butadiene-acrylonitrile), poly(butadiene-styrene), acrylonitrilebutadiene-styrene (ABS) resins or the like. The olefinic containing polymers can be formed with non-olefin containing monomer groups in any degree desired as long as the resultant polymer contains sufficient amounts of olefinic bonds therein to act as an active precursor of the desired amine containing polymer product. It is desirable that the copolymers contain at least about 10 percent by weight of olefinic containing polymer segments therein and, preferably, that the copolymer contain at least about 30 percent by weight of the olefinic containing polymer segments.

The polymers found useful as reactants in accordance with the present process can also be formed from olefinic monomers such as propylene, butylene, decylene and the like which produce, through branching, isomerization and the like, polymeric material having residual olefinic bonds therein. In addition, asphalts and asphaltene compositions can also be used herein. The particular olefinic containing polymer to be used will, of course, depend on the nature of the resultant polyamine polymers desired.

The nitrogen atom containing reactant can be selected from compounds having the formula:

wherein R and $R^1$ are the same or different and selected from hydrogen or a $C_1$–$C_{20}$ hydrocarbon radical, such as alkyl, aryl, alkaryl, aralkyl, and cycloalkyl groups. It is preferred that each of the hydrocarbon radicals be selected from a $C_1$–$C_{20}$ radical, as described above. Illustrative examples of amines found suitable as a reactant in the present process are ammonia, methylamine, ethylamine, propylamine, butylamine, n-pentylamine, hexylamine, decylamine, dodecylamine, dimethylamine, diethylamine, dipropylamine, diisopropyl amine, di-n-butylamine, diisobutylamine, dipentylamine, di-2,2,4-trimethylpentylamine, dihexylamine ethylhexylamine diheptylamine, dinonylamine, butylpentadecylamine, diphenylamine, ditolylamine, methylcumenylamine, dibenzylamine, methyl-2-phenylethylamine, methylnapthylamine, diidenylamine, di-m-xylylamine, di-octenylamine, dipentenylamine, methylbutenylamine, dicyclopentylamine, di(methylcyclopentyl)amine, and butylcylococtylamine and the like. In addition, R and $R^1$ can be joined to form a single alkylene radical having from 2 to 6 carbon atoms, as illustrated by the compounds, ethylenimine, azetidine, pyrrolidine, dimethyl aziridine and the like. The preferred amino compounds of the above formula have at least R represented by a hydrocarbon radical as defined above.

The aminomethylation of the olefinic containing polymer has been found to readily occur when a preformed olefin bond containing polymer and an amino compound, as described above, are contacted with carbon monoxide and water in the presence of the catalyst described below. It has been unexpectedly found that water acts as an effective source of hydrogen in the subject process, aids in the formation of the desired polymer product, and does not have the detrimental safety problems normally associated with other hydrogen sources, such as hydrogen gas of the prior art. Water is, therefore, the required hydrogen source. Hydrogen gas can be used as a supplemental hydrogen source. It should only be used as a minor amount of the hydrogen source as its presence reduces the effective yield of the reaction.

It has been unexpectedly found that polymers which contain secondary amino groups as the predominant amino group within the resultant polymer can be readily formed according to the present process when the nitrogen containing reactant is ammonia. When hydrocarbyl substituted nitrogen containing reactants i.e. when either R alone or R and $R^1$ are hydrocarbyl groups as indicated above, are used, the polyamine polymer formed will contain tertiary amino groups as the predominant amino groups within the resultant polymer.

The subject process is performed using liquid phase conditions. Any suitable organic liquid can be employed which is inert to the reaction conditions, the reactants, the catalyst and the products. Examples of suitable solvents that can be used in accordance with this invention include hydrocarbons such as the aromatics, aliphatics or alicyclic hydrocarbons, ethers, esters, etc.

Examples of suitable hydrocarbons that can be employed as the solvent include aromatic hydrocarbons such as benzene, toluene, xylene, ethyl benzene, tetraline, etc.; aliphatic hydrocarbons such as butane, pentane, isopentane, hexane, isohexane, heptane, octane, isooctane, naphtha, gasoline, kerosene, mineral oil, etc.; alicyclic hydrocarbons, such as cyclopentane, cyclohexane, methylcyclopentane, decalin, indane, etc.

Ethers can also be employed as the reaction solvent, such as diisopropyl ether, di-n-butyl ether, ethylene glycol diisobutyl ether, methyl o-tolyl ether, ethylene glycol dibutyl ether, diisoamyl ether, methyl p-tolyl ether, methyl m-tolyl ether, dichloroethyl ether, ethylene glycol diisoamyl ether, diethylene glycol diethyl ether, ethylbenzyl ether, diethylene glycol diethyl ether, diethylene glycol dimethyl ether, ethylene glycol diethyl ether, ethylene glycol diphenyl ether, triethylene glycol diethyl ether, diethylene glycol di-n-hexyl ether, tetraethylene glycol dimethyl ether, tetraethylene glycol dibutyl ether, etc.

Various esters can also be employed as the solvent, such as ethyl formate, methyl acetate, ethyl acetate, n-propyl formate, isopropyl acetate, ethyl propionate, n-propyl acetate sec-butyl acetate, isobutyl acetate, ethyl-n-butylate, n-butyl acetate, isoamyl acetate, n-amyl acetate, ethyl formate, ethylene glycol diacetate, glycol diformate, cyclohexyl acetate, furfuryl acetate, isoamyl n-butyrate, diethyl oxalate, isoamyl isovalerate, methyl benzoate, diethyl malonate, valerolactone, ethyl benzoate, methyl salicylate, n-propyl benzoate, n-butyl oxalate, n-butyl benzoate, diisoamyl phthalate, dimethyl phthalate, diethyl phthalate, benzyl benzoate, n-butyl phthalate, etc. A preferred class of ester solvents includes the lactones, e.g., butyrlactone valerolactone and their derivatives having lower ($C_1$–$C_5$) alkyl substituents. Alcohols can also be employed as a reaction solvent. Preferably, tertiary alcohols, such as t-butyl or t-amyl alcohol, are employed since these materials are substantially non-reactive under the reaction conditions.

Tertiary amines can also be employed as the reaction solvent, the nitrogen atom, by definition, being substituted with three hydrocarbyl groups which are inert with respect to the reaction, such as, for example, alkyl, aryl, alkaryl, aralkyl groups and the like. Examples of suitable tertiary amines include triethylamine, tripropylamine, triisobutylamine, trihexylamine, triheptylamine, triamylamine, dibenzyl ethylamine, dibutyl ethylamine, dimethyl pentylamine, diphenyl ethylamine, diphenyl methylamine, dimethyl aniline, pyridine, dimethyl pyridine, methoxy pyridine, methyl pyrrolidine, ethyl pyrrolidine and the like. The preferred solvents are the tertiary amines and, especially, pyridine, aniline, substituted pyrrolidine and its derivatives.

In the case where ammonia is the nitrogen atom containing reactant, ammonia can also be used as the liquid solvent. The excess of that required to form the desired product is inert to the catalyst and does not exhibit detrimental effects. Ammonia should not be used as solvent when other nitrogen atom containing reactants are used.

The particular solvent to be used will depend on its ability to remain in the liquid state at both ambient and at reaction conditions to facilitate the mixing of the components, its solvating ability with respect to at least some of the reactants, and its ease of handling, as can be readily determined by the artisan.

The reaction is performed under relatively mild conditions including temperatures from about 50° to about 250° C.; preferably from about 100° to about 200° C. Sufficient pressure should be used to maintain the reaction medium in a liquid phase. The reaction should be carried out at a pressure of from about 30 to about 300 atmospheres and, preferably, from about 30 to 100 atmospheres. The pressure can be maintained by the pressure of the carbon monoxide and, when used, hydrogen supplied to the reaction zone. If desired, a suitable inert gas, such as nitrogen can also be charged to the reaction zone to increase the pressure within the reaction zone.

The ratio of the reactants can be widely varied. The mole ratio of carbon monoxide to the hydrogen source (water alone or with minor amounts of hydrogen) should be at least about 3:1. Higher ratios, such as 5:1 or above, are preferred. The carbon monoxide can be used in excess to form sufficient pressure required in the reaction zone, as described above. The mole ratio of hydrogen source to amine can be varied from about 1:10 to 10:1 with from about 1:3 to 3:1 being preferred. Finally, the ratio of olefinic bond contained in the polymer to the amine reactant should be at least from about 1 to 1 and preferably from at least about 1 to 2.

The catalyst required to cause the formation of the desired polymeric polyamine/amide comprises rhodium compounds selected from elemental rhodium, rhodium salts, rhodium oxides, rhodium carbonyls, rhodium ligands as described hereinbelow. The preferred catalysts are formed from rhodium compounds wherein the rhodium atom is the plus one valance state. The exact chemical and physical composition of the entity which acts as the catalyst for the subject reaction is not known with certainty because of the possible restructuring and/or interaction of the rhodium compound used and the reactants contained in the reaction zone. Whether the rhodium compounds described herein directly act as the catalyst or as the precursor for the catalyst entity which causes the presently desired aminoethylation is immaterial. The subject rhodium compounds will be referred herein as the "catalyst" as they have unexpectedly been found to aid directly and/or indirectly in the formation of desired polymers by the present one-step process and to give the desired product in good yields.

The rhodium compounds which are useful in the subject invention must have some degree of solubility in the liquid media in which the subject aminomethylation is to take place. The liquid media and/or catalyst to be used in a particular reaction should be chosen so that the catalyst has some degree of solubility under the reaction conditions as can be readily determined by those skilled in the art using conventional methods.

The rhodium compounds which are useful as a catalyst in the subject process are rhodium atom containing compounds of the general formula:

$$Rh_r[A]_a[B]_b[C]_c$$

wherein A represents a halo, nitro or sulfo group; B represents a chemical moiety which contains at least one pair of unshared electrons such as by containing carbonyls, olefinic, phosphites, ethers, amine, sulfide groups or mixtures thereof; C represents an anion capable, when necessary, to form a neutral rhodium atom containing compound; and r, a, b and c are each a whole integer with r being at least 1 and a, b and c including zero.

The catalyst can be added directly to the reaction medium either prior to, with, or subsequent to the introduction of the other required reactants.

The rhodium compound useful in the present invention can be metallic rhodium. The metallic rhodium can be in any form such as a powder ribbon, or coated on an inert support. The inert support can be any conventional catalytic support as are well known such as formed from alumina, carbon, or a metal oxide, as, for example, an alkali or alkaline earth metal oxide and the like. The coating of metallic rhodium can be done by vapor disposition or other conventional methods and should be present in from about 2 to 8 percent by weight of the inert support. Metallic rhodium has, per se, substantially no degree of solubility in the liquid media contemplated for use but, it is believed that metallic rhodium reacts with some of the components in the reaction zone to form a soluble product which actually causes the desired aminomethylation to proceed. The metallic rhodium is, most probably, a precursor for the actual catalytic entity of the subject process.

The catalyst found useful in the subject process can be a rhodium salt of an inorganic acid such as, for example rhodium chloride, rhodium nitrate, rhodium sulfate, rhodium perchlorate and the like or of an organic acid such as rhodium acetate and the like. The rhodium salts are well known commercial products formed conventionally by the reaction of rhodium oxide with an acid. The salt can be used in its anhydrous state or as a hydrated salt. The hydrated salts are preferred.

The catalyst of the subject process can be a rhodium ligand. The ligand can be formed in coordination with rhodium in any one of its valence states; that is of zero or plus 1, 2 or 3. The ligand entity is formed from chemical moieties which contain an unshared pair of electrons such as atoms selected from nitrogen, oxygen, phosphorous or sulfur or which contains unsaturation. The ligand can be in the form of a carbonyl; an olefin such as ethylene, butene and the like; diolefins such as norbornodiene (NBD), cyclooctadiene-1,5 and the like; aliphatic, aromatic, aryl or aliphatic phosphites, such as triethyl phosphite, tributyl phosphite, trimethyl phosphite, triphenyl phosphite, dimethyl phenyl phosphite, tritolyl phosphite, tribenzyl phosphite, ditolyl phenyl phosphite, and the like; aliphatic and cyclic ethers such as dimethyl and diethyl oxide, dioxane, dialkyl ether gylcols, acetyl acetone and the like; primary, secondary, and tertiary amines which contain alkyl, aryl, alkaryl, aralkyl cycloalkyl groups of mixtures thereof such as trimethyl amine, diethyl amine, p-toluidine and the like; heterocyclic bases such as pyridine, bypyridine and the like; ammonia; sulfides such as dialkyl, diaryl, alicyclic heterocyclic sulfides and the like; and mixtures of said ligand components with rhodium. When the ligand is formed from uncharged ligand components with charged rhodium, the compound is formed into a stable neutral state with an anion such as a chloride, perchlorate, nitrate, hexaflourophosphate and the like.

The ligand may be added directly to the reaction medium and/or introduced into the medium as a complex of the ligand precursor with the rhodium salt, chelate, hydride or carbonyl. For example, the appropriate precursor of the desired ligand can be introduced into the reaction zone with a rhodium precursor such as, for example, rhodium oxide, a rhodium carbonyl as dirhodium dichloro tetracarbonyl, and the like.

The catalyst has been found to be effective to cause the desired aminomethylation of an olefinic containing polymer when used in a molar ration of rhodium atom to olefin bond of from about $3 \times 10^{-5}$ to $2.5 \times 10^{-3}$ and preferably from about $2 \times 10^{-4}$ to $2 \times 10^{-3}$. The most preferred range from both effectiveness and economy is from $5 \times 10^{-4}$ to $2 \times 10^{-3}$. Although greater amounts of catalyst can be used, such has not been found required.

The rhodium catalysts found useful in the subject invention may be used in combination with other metal complexes which are known to cause aminomethylation as, for example, iron or cobalt carbonyl complexes and the like although poorer results are normally achieved. The rhodium catalyst should, therefore, be the sole or major catalyst used in the subject invention.

The preferred rhodium catalysts are those which have rhodium in its plus 1 valence state and have been complexed with a carbonyl or diolefin or both.

The reaction is carried out in a vessel which is preferably adapted for gas injection, agitation and heating. The liquid media is first introduced followed by the olefinic containing compound, water, the amine and the rhodium catalyst. The vessel is closed and charged to a specific partial pressure with carbon monoxide. The reaction is carried out under both elevated temperature of from about 50° C. to 250° C. and pressure of from about 30 to about 300 atmospheres. The reactor and its contents are maintained at the desired elevated temperature for a period of time from about 15 minutes to about 10 hours with from about 30 minutes to 5 hours being sufficient and preferred in most instances. The vessel is then cooled and, where appropriate, degassed and the polymer is recovered and its amino and amido nitrogen contents are determined by standard analytical techniques.

It is preferred that the liquid media (solvent) contain at least some water such as at least from about 5 to 10 volume percent based on the volume of the solvent.

The polymer product formed in accordance with the instant invention are polymers which contain a multiplicity of amino groups pendant from the polymeric backbone. Further, the present process facilitates the formation of polymers of hydrocarbon backbone with pendant amino groups in which the amino nitrogen is bridged to the hydrocarbon backbone by a methylene group. The particular hydrocarbon polymer chain can be custom selected from those homopolymers or copolymers which are known and contain, prior to subjection to the subject process, olefinic unsaturation therein, as described herein above.

A further embodiment of the subject invention causes the formation of polymers which contain a multiplicity of secondary amino groups pendant from a hydrocarbon polymer backbone. These polymers have unexpectedly been found to be readily formed by utilizing ammonia as the nitrogen compound in the subject process.

The following examples are given for illustrative purposes only and are not meant to be a limitation on the subject invention except as indicated in the appended claims. All parts and percentages are by weight unless otherwise indicated.

EXAMPLE I

Into a 1 liter Parr reactor equipped with a mechanical stirrer was placed 410 parts N-methyl pyrrolidine; 50 parts commercially obtained polybutadiene (80%, 1,2 configuration) having a number average molecular weight of 1000; 12.8 parts pyrrolidine; 4 parts water; and 0.25 parts of the rhodium ligand

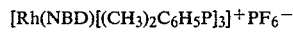

The ratio of Rhodium atom to olefin was $3.3 \times 10^{-4}$. The reactor was sealed and pressurized with carbon monoxide to 1000 psig at ambient temperature. The reactor was placed in an oil shaker bath and maintained at 140° C. for 15 hours. The contents were removed from the reactor, taken up in tetrahydrofuran and precipitated with dionized water. The resultant product was found to be soluble in acetone, ethanol, ether and other organic solvents, insoluble in water, but soluble in aqueous HCl having a pH of 1.5. The sample was analyzed by NMR spectroscopy and found to contain both amine and amide functionality in about equal amounts. Peaks were obtained at 5.2 ppm for C=CH$_2$ protons; at 3.4 ppm (—CH$_2$N—CO—) and 2.2 ppm (—COCH$_2$—) for polyamide and at 2.45 ppm (CH$_2$N—) to polyamine. The polymer was about 90% substituted.

EXAMPLE II

A polymeric polyamine/amide was formed in the same manner as described in Example I above, except that the catalyst was

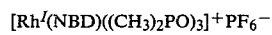

The recovered product was substantially the same as recovered in Example I above.

EXAMPLE III

Into a 300 ml stainless steel Parr reactor equipped with a mechanical reactor was charged with 6.7 parts polybutadiene as used in Example I above; 24.6 parts N-methyl pyrrolidine; 17.9 parts pyrrolidine; and 4.5 parts diionized water and 0.18 parts of

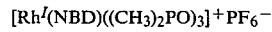

The reactor was sealed and pressurized with 1000 psig carbon monoxide at room temperature. The reactor was stirred for 16 hours at 140° C. The polymer was recovered by dissolving in tetrahydrofuran, precipitating with water and drying under vacuum. The polymer product was substantially the same as in Example I except that the amino content was substantially greater.

EXAMPLE IV

A polymer is formed in the same manner as described in Example I above except that the pyrrolidine was eliminated and the sealed vessel was charged with 100 psi of ammonia. The product formed has an amine content which is predominantly secondary amino groups.

While the invention has been described in connection with certain preferred embodiments, it is not intended to limit the invention to the particular forms set forth, but, on the contrary, it is intended to cover such alternatives, modifications and equivalents as defined by the appended claims.

What is claimed is:

1. A process of forming polymeric polyamine/amide comprising contacting, an inert liquid solvent and, as reactants, a polymer having olefinic unsaturation distributed therein, carbon monoxide water, and a nitrogen atom containing compound selected from ammonia, a primary amine or a secondary amine at a temperature of from about 50° to 250° C. and at a pressure of from about 30 to about 300 atmospheres in the presence of a catalyst consisting essentially of a rhodium atom containing compound selected from metallic rhodium, rhodium salts, rhodium carbonyls, rhodium oxides or ligands thereof and recovering the polymeric product.

2. The process of claim 1, wherein the rhodium compound contains a ligand moiety possessing olefinic unsaturation or at least one atom selected from oxygen, sulfur, phosphorus, or nitrogen.

3. The process of claim 1, wherein the catalyst is a rhodium atom containing compound having the general formula:

$$Rh_r[A]_a[B]_b[C]_c$$

wherein A represents halo, nitro or sulfo; B represents a chemical moiety containing at least one pair of unshared electrons selected from carbonyls, olefins, phosphites, ethers, amines, sulfides or mixtures thereof; and C is a neutral compound forming anion and a, b and c are each whole integers including zero r is a whole integer of 1 or greater.

4. The process of claim 1, wherein the polymeric reactant has an average molecular weight of at least about 500.

5. The process of claim 1, wherein the liquid media is selected from aliphatic, alicyclic or aromatic hydrocarbons which are unsubstituted or substituted with alcohol, ester or tertiary amine groups.

6. The process of claim 4, wherein the polymeric reactant is a polymer formed from at least one $C_4$–$C_{10}$ monomer having multiple olefinic groups therein.

7. The process of claim 6, wherein the polymeric reactant is a copolymer containing polybutadiene segments.

8. The process of claim 4, wherein the polymeric reactant is a copolymer formed from at least one $C_4$–$C_{10}$ monomer having multiple olefinic groups therein and at least one copolymerizable vinyl monomer.

9. The process of claim 8, wherein the polymeric reactant is a polybutadiene-styrene copolymer.

10. The process of claims 1, 2, 3, 4, 5, 6, 7, 8 or 9, wherein the nitrogen atom containing compound is ammonia.

11. A polymeric polyamine formed according to the process of claim 1, 2, 3, 4, 5, 6, 7, 8 or 9.

12. The polymeric polyamine of claim 11, having pendant secondary amino groups formed by utilizing ammonia as the nitrogen atom containing reactant.

* * * * *